United States Patent Office 2,815,089
Patented Dec. 3, 1957

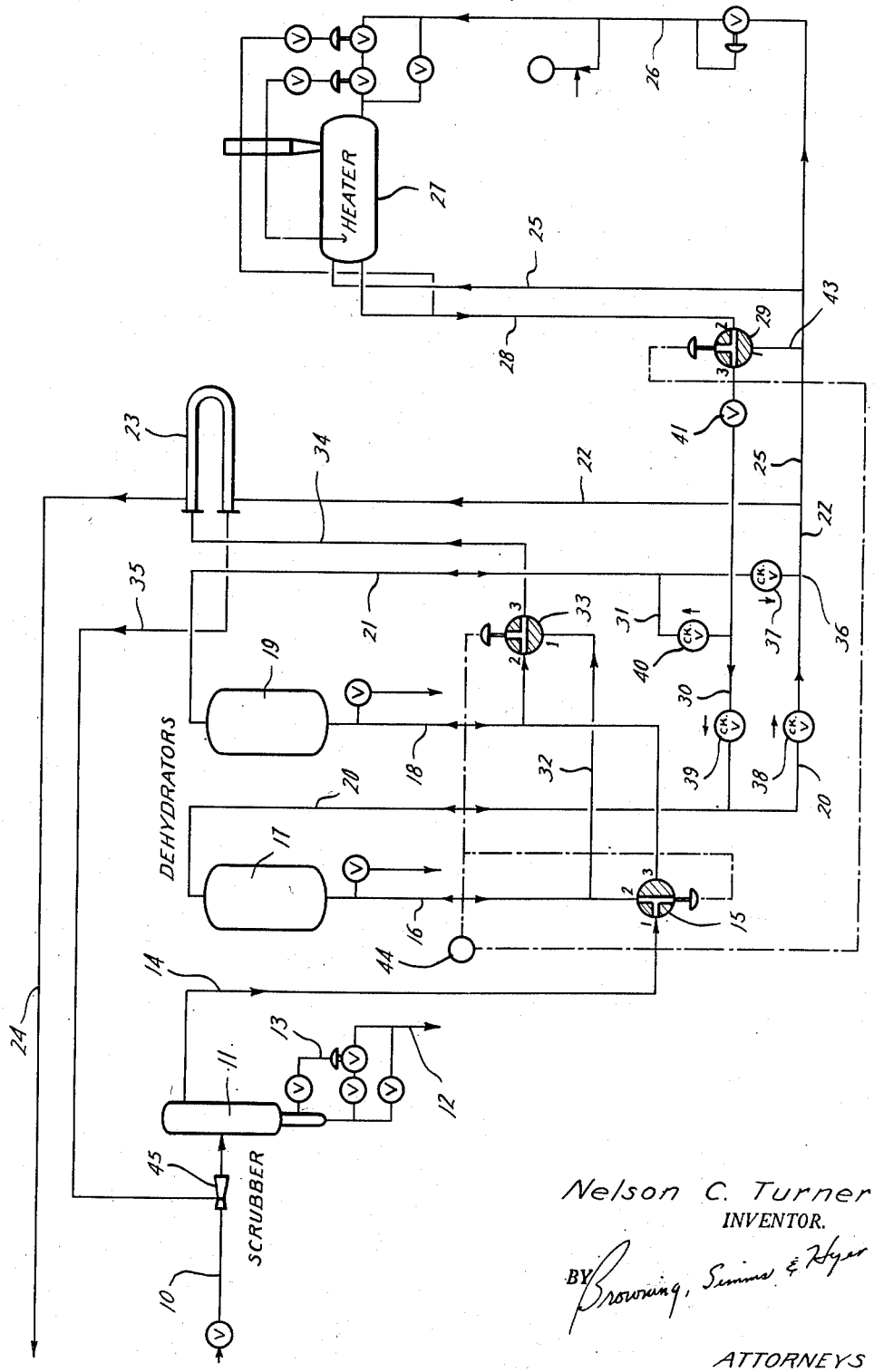

2,815,089

GAS DEHYDRATION APPARATUS AND PROCESS

Nelson C. Turner, Houston, Tex., assignor to Hudson Engineering Corporation, Houston, Tex., a corporation of Texas Application June 27, 1955, Serial No. 518,157

6 Claims. (Cl. 183—4.7)

This invention relates to improvements in a gas dehydration apparatus and process of the general type wherein each of a plurality of dehydrating units is alternately placed in dehydrating service and on regeneration so as to permit continuous dehydration of a gas stream. In another of its aspects, the invention relates to an improved apparatus and process for regenerating such units to provide a simpler mode of operation thereof and to reduce the pressure drop of the main gas stream in passing therethrough.

Gas dehydration systems, as for example those employed to dehydrate natural gas at high pressures, conventionally employ at least two dehydrating units connected in parallel with each other so that one unit can be placed on adsorption while the other is being regenerated. The units are switched back and forth between adsorption and regeneration in order that dehydration of the main gas stream can be continuous. During the regeneration cycle, it has been the practice to withdraw a portion of the main gas stream before it is dehydrated which, upon heating, is passed downwardly through the bed of adsorption material to be regenerated in order to heat the same and drive the moisture therefrom. Such downflow of heated regeneration gas is considered desirable in order to properly regenerate the bed. Thus, as the heated regeneration gas first contacts the upper portion of the bed, it gives up heat to the adsorption material to heat the same and drive moisture therefrom. The gas thus takes up moisture from the heated portion of the bed and as it continues flowing through the remainder of the bed, it will drop in temperature due to contact with the unheated portion of the bed. This cooling can and often does result in condensation of moisture from the regeneration gas onto the adsorption material. If the heated regeneration gas were caused to flow upwardly through the bed of adsorption material, water condensed from the gas in the cooler upper regions of the bed would tend to flow back down into the hotter portions thereof which have been regenerated. On the other hand, the downflow of hot regeneration gas permits such water to trickle down through the bed so that it can be withdrawn from the lower portion thereof without re-evaporation of the same. As a result, the time required for complete regeneration using the downflow type of operation can be made much shorter than that required for the upflow type of operation.

After the bed has been so heated, it is necessary that it be cooled before it is placed back in adsorption service on the main gas stream. Heretofore, such cooling has been accomplished by passing unheated gas withdrawn from the wet main gas stream upwardly through the previously heated bed during the cooling portion of the regeneration cycle. In other words, the direction of gas flow was reversed between the heating and cooling portions of the regeneration cycle. One reason for this is that it is undesirable to contaminate the upper portion of the bed with moisture adsorbed from the cooling gas, as would happen with downflow cooling, because the main gas stream is normally conducted upwardly through the bed while it is on adsorption and it is desirable that the last portion of the bed which this gas contacts should be as dry as possible. Stated in another manner, if the upper part of the bed is contaminated with moisture by the cooling gas, then the main gas stream can pick up some of this moisture just before it emerges from the bed.

The reversal of direction of gas flow through a bed on regeneration necessarily requires valves and piping particularly arranged to accomplish the reversal of flow. Such arrangements are at best quite cumbersome and costly to install, and it would be desirable to possess a dehydrating apparatus and process not requiring such reversal so as to eliminate the extra valves and piping necessary to accomplish the same.

Also in such gas dehydrating systems, it is conventional to employ a choke or pressure reducing valve downstream of the point where the wet regeneration gas is withdrawn from the main gas stream to reduce the pressure of the latter sufficiently that the regeneration gas can be returned thereto without compression thereof. Thus the regeneration gas is passed from a point upstream of such valve, through the system to achieve its intended function and then is returned to the main gas stream downstream of the valve.

Since the pressure drop required to cause the regeneration gas to flow through its part of the system is usually several times that required to cause the main gas stream to flow through its part of the system, the use of such a valve is very wasteful of energy since the volume of the main gas stream is several times that of the regeneration gas. Compression of the main gas stream to return it to substantially its original pressure is quite costly, both in investment and in operating costs. For example, in a typical plant handling 125,000,000 cubic feet a day of gas to be dehydrated, it is customary to take a thirty to fifty pound per square inch drop in the main gas stream pressure across the dehydrating unit in order to obtain the necessary regeneration gas flow. A fifty pound drop on all gas going through the dehydrating unit represents a horsepower loss (at the compressor) of 1500 horsepower which in turn involves an investment in excess of $300,000 and an operating cost, with fuel at fifty cents per thousand cubic feet, of $180 per day. Naturally, it would be desirable to avoid such investment and cost if at all possible.

It is an object of this invention to provide a gas dehydration apparatus and process wherein the regeneration gas is derived from the outlet of a dehydrating unit on adsorption and is passed downwardly through a unit on regeneration both during the heating and cooling portions of the regeneration cycle thereby avoiding switching of the direction of flow of the regeneration gas stream between such cycle portions and decreasing the number of valves and conduits necessary to operate the system.

Another object of the invention is to provide gas dehydrating apparatus and process wherein regeneration gas flows downwardly through a bed of adsorptive material being regenerated both during the heating and cooling steps of the regeneration cycle to thereby avoid reversing the direction of flow with its attendant requirement for additional valve manipulation and wherein the regeneration gas is returned to the main gas stream by means of an ejector so that a pressure reduction of the main gas stream, aside from that occasioned by use of the ejector, is not required in order to permit the regeneration gas to return thereto.

Another object of the invention is to provide a gas dehydration system in which a regeneration gas which has been withdrawn from the main gas stream is returned thereto after it has achieved its regenerating function by means of an ejector in the main gas stream whereby the only reduction in pressure of the main gas stream occurring in the dehydration system is that required for operation of the ejector and to flow the main gas stream through the dehydration system.

Another object of the invention is to provide a gas dehydration apparatus wherein the switching of the main gas stream from one dehydrating unit to another automatically places a spent dehydrating unit on regeneration.

Another object is to provide such an apparatus wherein simple check valves are employed in such a manner that the unit on regeneration is segregated in the desired manner from a unit on dehydration by the superior pressure of main gas stream acting in opposition to the lesser pressure of the regeneration gas to hold the check valves closed.

Other objects, advantages and features of this invention will be apparent to one skilled in the art upon a consideration of the written specification, the appended claims and the attached drawing wherein there is shown a schematic flow sheet of a dehydrating system illustrating a preferred embodiment of the apparatus and process of this invention.

Thus, referring to the drawing, the gas to be dehydrated, such as a normally gaseous hydrocarbon stream and particularly natural gas, is passed into the system, via main conduit 10. The wet inlet gas has at least a part of any water entrained therein, as well as other condensed liquids, separated therefrom in scrubber 11. The condensate is drained from the scrubber through a conduit 12 under the control of a liquid level controller 13.

A plurality of dehydrating or treating units are provided with conduit means connecting the units in parallel with each other so that gas to be dehydrated can be passed through a unit on adsorption while another unit is regenerated. Thus, an inlet conduit 14 is connected by a three-way control valve 15 and conduit 16 to a dehydrator unit 17 so that the wet main gas stream can be passed upwardly through this unit. By manipulation of valve 15, the scrubbed gas can be switched to pass through a conduit 18 into another dehydrator unit 19. Each of the dehydrator units contains a bed of solid absorptive material capable of adsorbing moisture from the main gas stream. Such material can comprise any suitable desiccating agent such as bauxite and the like.

After the main gas stream flows upwardly through the bed of adsorptive material in one of the dehydrator units 17 or 19, the resulting dehydrated main gas stream leaves the dehydrators by one of main gas stream outlet conduits 20 or 21 depending upon which dehydrator is on adsorption. Each of conduits 20 and 21 are connected to a main gas conduit 22 which conducts the dehydrated gas to a heat exchanger 23 and thence via conduit 24 to a pipeline or other desired destination for the dehydrated gas.

In accordance with this invention, a portion of the dehydrated main gas stream from one of the dehydrators is segregated for use as the regeneration gas. Thus, a conduit 25 can be connected with the outlet main gas stream conduit 22 to withdraw the regeneration gas for transmission to regeneration gas heater 27. A portion of the stream so withdrawn can be passed through conduit 26 to serve as fuel for the heater. The regeneration gas stream is heated in heater 27 to an elevated temperature sufficiently high that the heated gas can regenerate a spent bed of adsorptive material in one of dehydrators 17 and 19. The temperature of the gas will be in part determined by the specific nature of the adsorptive material but ordinarily will be in a range of 400° F. to 500° F. Suitable temperatures for regeneration of specific adsorptive materials are known to those skilled in the art and can be readily selected from known data.

The regeneration gas heater outlet is connected to conduit means to conduct the heated regeneration gas to an upper portion of the dehydrator unit or regeneration for downflow therethrough. Thus, a conduit 28 having a three-way valve 29 therein for a purpose explained below, is connected between the heater outlet and conduits 20 and 21 by branch conduits 30 and 31. When dehydrator 17 is to be regenerated, the gas passes via branch conduit 30 into conduit 20 to be discharged into the dehydrator above the bed of adsorptive material therein. The heated regeneration gas thus flows downwardly through the bed and emerges via conduit 16 to flow through conduit 32, valve 33 and conduit 34 to cooler 23 where it is cooled by indirect heat exchange with the dehydrated main gas stream. When the heated regeneration gas is to be passed to dehydrator 19, it flows via branch conduit 31 into conduit 21 to pass downwardly through the bed in such dehydrator. Thereafter, it flows out through conduit 18, valve 33 and conduit 34 to cooler 23. The cooled regeneration gas in either case is then returned to the system via conduit 35.

In order to make the operation of the system fully automatic and to eliminate as many valves and as much piping as possible and to provide valves which are economical, a system has been arranged whereby upon switching one of the dehydrator units to adsorption service, the other dehydrator is automatically placed on regeneration. Thus the outlet dehydrated gas conduits 20 and 21 from each of the dehydrator units meet at a common point 36 for connection with the common dehydrated main gas stream conduit 22. Upstream of this common point are provided check valves 37 and 38 in conduits 20 and 21 so as to permit gas flow therethrough toward the common point 36. Likewise, the branches 30 and 31 of the heated regeneration gas conduit 28 have disposed therein check valves 39 and 40 which are arranged to permit flow only in a direction away from the heater. With this arrangement, it can be seen that upon placing dehydrator 17 on adsorption, check valves 37 and 39 block flow of the main dehydrated gas stream to dehydrator 19 while check valve 38 permits the main dehydrated gas stream to flow to the common main gas stream outlet conduit 22. On the other hand, the heated regeneration gas is prevented from flowing through check valves 37 and 39 because the main dehydrated gas stream pressure urging these valves closed is higher than the pressure of the regeneration gas which urges them open. In this connection, a flow regulating valve 41 can be provided in the regeneration gas conduit system upstream of the check valves to regulate the flow of regeneration gas and to reduce its pressure somewhat (e. g. 10 or 20 pounds per square inch) so as to assure that the dehydrated gas acting to hold check valves 37 and 39 closed will always be at higher pressure than the regeneration gas. The heated regeneration gas then can flow through check valve 40 to dehydrator 19. Conversely, when dehydrator 19 is placed on adsorption, dehydrator 17 is automatically placed on regeneration. Thus, the dehydrated gas stream from dehydrator 19 flows through check valve 37 to conduit 22 but its superior pressure holds check valves 38 and 40 in closed position against the lower pressure exerted thereon by the regeneration gas. Accordingly, the heated regeneration gas must flow through check valve 39 and conduit 20 to dehydrator 17. Thus, by this system of check valves held closed by the dehydrated gas pressure to prevent intermingling of the dehydrated gas and regeneration gas, the system can be automatically switched from regeneration to dehydration by manipulation of only valves 15 and 33.

In accordance with this invention, a portion of the regeneration cycle for each bed of adsorption material is devoted to cooling of the bed before it is placed on adsorption. To accomplish this, by-pass means including a by-pass conduit 43 controlled by three-way valve 29, is arranged to by-pass dehydrated regeneration gas around heater 27 for flow through one of conduits 20 and 21 to the dehydrators 17 or 19 on regeneration. The cooling gas thus flows downwardly through the bed of dehydrating material and by this arrangement, there is avoided any necessity for extra valves and piping for reversing the direction of flow of the cooling gas relative to that of the heated regeneration gas and the cooling gas flows through the same conduits as the heated regeneration gas except for flow through heater 27.

In a preferred form, valves 15, 29 and 33 are automatically controlled by a time cycle controller 44 to switch flow of wet gas from one dehydrator to the other and to by-pass regeneration gas around heater 27. As above explained, the switching of one dehydrator to adsorption service automatically places the other on regeneration due to the check valve arrangement above described operating in conjunction with the three-way valves. As a typical example of a program of valve operation, the following may be given:

|  | Time | |
| --- | --- | --- |
|  | Unit 17 on Adsorption, Unit 19 on Regeneration | Unit 19 on Adsorption, Unit 17 on Regeneration |
| Valve 15: | | |
| Ports 1 to 2 | Open | Closed |
| Ports 1 to 3 | Closed | Open |
| Valve 33: | | |
| Ports 1 to 3 | Closed | Open |
| Ports 2 to 3 | Open | Closed |
| Valve 29: | | |
| Ports 1 to 3 | Closed / Open | Closed / Open |
| Ports 2 to 3 | Open / Closed | Open / Closed |

As above mentioned, this invention provides a means for returning the regeneration gas stream to the main gas stream without substantial permanent reduction in the pressure of the main gas stream. Thus, an ejector 45 can be disposed in conduit 10 to have its throat connected with conduit 35 so that upon flow of the main gas stream through the ejector, the pressure at the throat will be sufficiently reduced so that the regeneration gas will flow through conduit 35 into the ejector to thereby be returned to the main gas stream. Of course, the pressure immediately downstream of the ejector in conduit 10 substantially approaches that of the upstream pressure and it is contemplated for a system handling 125,000,000 cubic feet of gas a day, the pressure drop across the ejector will only be about 10 p. s. i. where the upstream pressure is 1000 p. s. i. Under these conditions, the pressure of the regeneration gas in conduit 35 will normally be of the order of 960 p. s. i. With such arrangement, the only pressure drop taken by the main gas stream in returning the regeneration gas thereto is that required to operate ejector 45 which may be of the order of 10 p. s. i. Then since the pressure drop of the main gas stream through a well designed dehydrating system will be substantially less than that across the ejector, it can be seen that there is very little permanent loss in pressure in the main gas stream in flowing through the dehydrating system and such loss will be only one-fourth or less than that experienced in a conventional system where entire main gas stream pressure is reduced by a choke or valve to be less than that of the effluent regeneration gas.

It is believed that the operation of the apparatus and process is apparent from the foregoing. Thus, with dehydrator 17 on adsorption and dehydrator 19 on regeneration, the wet main gas stream flows through conduits 10 and 14 via ports 1 and 2 of valve 15 to dehydrator 17. It then passes from this dehydrator via conduit 20, check valve 38, and conduit 22 to cooler 23 after which it is discharged from the system. For the regeneration of dehydrator 19, the dehydrated gas portion removed via conduit 25 is heated in heater 27 and passes through ports 2 and 3 of valve 29, check valve 40, and conduit 21 to dehydrator 19 for downflow therethrough. Thereafter, it is discharged through conduit 18, ports 2 and 3 of valve 33, and cooler 23 to ejector 45. After the dehydrator 19 has been sufficiently heated, time cycle controller 44 causes valve 29 to be positioned so that gas is by-passed from conduit 25 via by-pass 43 and ports 1 and 3 of valve 29 to the upper end of dehydrator 19 to cool the bed of dehydrating material therein. The cooling gas, like the heated regeneration gas, flows through valve 33 and cooler 23 to ejector 45. Upon dehydrator 17 becoming spent and 19 becoming regenerated, time cycle controller 44 switches valves 15, 33 and 29 so that the wet gas stream flows through ports 1 and 3 of valve 15 upwardly through conduit 18 into dehydrator 19. Thereafter, it passes via conduit 21, check valve 37 to conduit 22 and heat exchanger 23 to be discharged from the system. The heated regeneration gas is passed through ports 2 and 3 of valve 29, check valve 39 and conduit 20 to the upper end of dehydrator 17. After it has passed down through the bed of material therein, it flows through conduits 16 and 32, ports 1 and 3 of valve 33 and heat exchanger 23 back to ejector 45. To cool the bed of material in dehydrator 17, valve 29 is again switched by the time cycle controller to position ports 1 and 3 in alignment so that the cooling gas can by-pass the heater and flow through dehydrator 17.

While only two dehydrator units have been shown, any greater number can be employed in accordance with this invention. Also, it is contemplated that the ejector can be employed at any desired position in the main gas stream depending upon whether or not the regeneration gas is to be passed through the unit of adsorption.

From the foregoing it will be seen that this invention is one well adapted to attain all of the ends and objects hereinabove set forth, together with other advantages which are obvious and which are inherent to the apparatus and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. In a gas dehydration system wherein a main gas stream is dehydrated by passing it through a first bed of dehydrating material while a second bed of such material is being regenerated, the improved process for regeneration comprising the steps of continuously withdrawing a portion of the dehydrated gas effluent from the first bed, flowing said portion through a heating zone and therein heating such portion to a temperature sufficiently high to regenerate said second bed, flowing the thus heated gas portion downwardly through the second bed during an entire heating period until the latter is heated to a desired extent, then in a cooling step ceasing heating of said gas portion in said heating zone while continuing to withdraw said gas portion from the first bed effluent and flowing it downwardly through said second bed to cool the same, and continuously removing, during the heating and cooling steps, all of said gas portion from the second bed after it has flowed once therethrough while preventing flow of such gas portion so removed again through the second bed while it has a moisture content greater than that of said dehydrated gas effluent from the first bed.

2. In a gas dehydration system wherein a main gas stream is dehydrated by passing it through a first bed of dehydrating material while a second bed of such material is being regenerated, the improved process for regeneration comprising the steps of continuously withdrawing a portion of dehydrated gas from said first bed, continuously flowing the withdrawn portion downwardly through said second bed, heating said withdrawn gas portion prior to passage through the second bed for only an initial portion of the time it is passed therethrough but during an entire heating period so that the second bed is first heated in said heating period and then cooled in a cooling period by downflowing gas without changing the direction of the flow of the gas through the second bed, and maintaining the moisture content of said gas portion entering said second bed during said heating and cooling periods at a value not higher than the moisture content of said dehydrated gas from said first bed.

3. In a gas dehydration apparatus wherein a plurality of dehydrating units each containing a bed of solid dehydrating agent are provided with inlet and outlet conduit means connecting the units in parallel between an inlet and an outlet main gas stream conduit for alternately placing the units on adsorption and regeneration; a regeneration gas heater having its inlet connected to receive a portion of the main gas stream dried in one of said units; conduit means connected to the heater outlet and including branch conduits respectively connected to one of the inlet and outlet conduit means of each unit for discharge of heated regeneration gas into the unit on regeneration; check valves in each of the branch conduits limiting flow to be only in a direction away from the heater toward said units; check valves in each of said outlet conduits permitting flow of gas only toward said outlet main gas stream conduit, and means for removing regeneration gas from the units after it has passed through the bed of a unit on regeneration.

4. The apparatus of claim 3 in combination with an ejector in the inlet main gas stream conduit, said means for removing regeneration gas being connected to the ejector so that spent regeneration gas is returned to the main gas stream passing to a unit on adsorption.

5. An apparatus for dehydration of a main gas stream comprising at least two treating units each containing a bed of adsorptive material, means including main gas stream inlet and outlet conduits connected to said units for conducting gas to be dehydrated through one unit which is conditioned as an adsorber while another unit is being regenerated and for switching flow so that each unit is successively on adsorption and regeneration, said main gas stream outlet conduits being connected at a common point for discharge of gas from the apparatus, a check valve in each of the main gas stream outlet conduits upstream of and permitting flow only toward said common point, a gas heater having an inlet and an outlet, first conduit means connecting between the main gas stream outlet conduit of a unit on adsorption and the heater inlet to withdraw a portion of the dried main gas stream as regeneration gas, second conduit means connected to the heater outlet and having branch conduits respectively connected to the first mentioned means upstream of the check valves in said main gas stream outlet conduits to discharge heated regeneration gas for flow through a bed on regeneration, a check valve in each of said branch conduits permitting flow through the branch conduits only away from the heater, and conduit means for removing regeneration gas from a unit on regeneration after such gas has passed therethrough.

6. In a gas dehydration system wherein a main gas stream is dehydrated by passing it through a first bed of dehydrating material while a second bed of such material is being regenerated, the improved process for regeneration comprising the steps of flowing a regeneration gas consisting essentially of dehydrated gas effluent from the first bed through a heating zone and therein heating said regeneration gas to a temperature sufficiently high to regenerate said second bed, flowing the thus heated regeneration gas downwardly through the second bed during an entire heating period until the second bed is regenerated to a desired extent, then continuing to flow said regeneration gas downwardly through said second bed in a cooling period while ceasing to heat the same to thereby cool the second bed, continuously withdrawing all of the regeneration gas from the second bed after it has once passed therethrough and mixing the regeneration gas so withdrawn with influent gas passing to the first bed, and maintaining the moisture content of said regeneration gas while it is flowing to said second bed during said heating and cooling periods at a value not higher than the moisture content of said dehydrated gas effluent from the first bed.

References Cited in the file of this patent

UNITED STATES PATENTS

| | | |
|---|---|---|
| 2,535,902 | Dailey | Dec. 26, 1950 |
| 2,699,837 | Van Note | Jan. 18, 1955 |
| 2,747,681 | Schuftan et al. | May 29, 1956 |

FOREIGN PATENTS

| | | |
|---|---|---|
| 1,065,716 | France | Jan. 13, 1954 |